(12) United States Patent
Cordes (10) Patent No.: US 9,103,160 B2
(45) Date of Patent: Aug. 11, 2015

(54) INSULATING GLASS PANE

(76) Inventor: Reinhard Cordes, Bremen (DE)

(*) Notice: Subject to any disclaimer, the term of this patent is extended or adjusted under 35 U.S.C. 154(b) by 1057 days.

(21) Appl. No.: 13/125,168

(22) PCT Filed: Oct. 7, 2009

(86) PCT No.: PCT/EP2009/063015
§ 371 (c)(1),
(2), (4) Date: Jul. 15, 2011

(87) PCT Pub. No.: WO2010/046232
PCT Pub. Date: Apr. 29, 2010

(65) Prior Publication Data
US 2011/0261090 A1    Oct. 27, 2011

(30) Foreign Application Priority Data
Oct. 22, 2008    (DE) .................... 10 2008 052 806

(51) Int. Cl.
| H05B 37/00 | (2006.01) |
| E06B 3/66 | (2006.01) |
| G09F 19/22 | (2006.01) |
| F21V 33/00 | (2006.01) |
| F21Y 101/02 | (2006.01) |

(52) U.S. Cl.
CPC .............. *E06B 3/66* (2013.01); *E06B 3/6612* (2013.01); *G09F 19/226* (2013.01); *F21V 33/006* (2013.01); *F21Y 2101/02* (2013.01); *Y02B 80/24* (2013.01)

(58) Field of Classification Search
USPC ................. 315/185 R, 209 R, 291, 307, 312; 345/76, 77, 82
See application file for complete search history.

(56) References Cited

U.S. PATENT DOCUMENTS

| 2005/0083323 A1 | 4/2005 | Suzuki et al. |
| 2009/0046355 A1* | 2/2009 | Derda ........................ 359/359 |
| 2009/0073693 A1* | 3/2009 | Nall et al. ............... 362/249.02 |
| 2009/0114928 A1 | 5/2009 | Messere et al. |

FOREIGN PATENT DOCUMENTS

| DE | 4101277 A1 | 7/1992 |
| DE | 10026285 A1 | 11/2001 |
| DE | 10064534 A1 | 6/2002 |
| EP | 1834836 A1 | 9/2007 |
| FR | 2892594 A1 | 4/2007 |
| JP | 7-6875 | 1/1995 |
| JP | 2000-504153 A | 4/2000 |
| JP | 2004-69774 A | 3/2004 |
| JP | 2005-128089 A | 5/2005 |
| JP | 2006-184561 A | 7/2006 |
| JP | 2007-108459 A | 4/2007 |
| JP | 2007-147725 A | 6/2007 |
| JP | 2009-512977 A | 3/2009 |
| WO | 2007/045786 A1 | 4/2007 |
| WO | 2008/074800 A1 | 6/2008 |

* cited by examiner

*Primary Examiner* — Jimmy Vu
(74) *Attorney, Agent, or Firm* — Seed IP Law Group PLLC (57) ABSTRACT

The present invention concerns an insulating glass pane comprising a first and a second pane of glass, the first and second panes are arranged in mutually plane-parallel spaced relationship by means of spacers, an insulating space is formed between the first and second panes and gas-tightly sealed off, a plurality of mutually spaced light strips each having a plurality of mutually spaced light emitting elements are arranged in the insulating space and each of the light strips includes a torsionally stiff carrier passing through the insulating space parallel to the first and second panes.

20 Claims, 6 Drawing Sheets

INSULATING GLASS PANE

The present invention concerns an insulating glass pane and an arrangement of a plurality of insulating glass panes. The invention further concerns a method of representing a static or dynamic image by means of an arrangement of a plurality of insulating glass panes. The present invention further concerns a building facade having an insulating glass pane arrangement.

Insulating glass panes are generally known. They generally include two glass panes which are arranged in mutually plane-parallel relationship by means of spacers and form between them an insulating space which is generally filled with a noble gas and closed off gas-tightly and in particular diffusion-tightly. Such insulating glass panes are used in windows but are also used for producing in particular large-area glass facades on building constructions such as for example office buildings. The insulating glass insulates the corresponding building relative to the exterior and at the same time—depending on the respective coating on the insulating glass—permits a view through the insulating glass pane in question and the incidence of daylight through the insulating glass pane.

In particular large facades are readily used as a display surface. Very large display devices for representing texts, images, videos and the like are usually employed on facades. They are generally mounted to the facade in the form of an opaque LED (light emitting diode) wall. In the case of coloured representations for example an RGB-LED (LED with red, green and blue components) or a corresponding group of a plurality of single-coloured LEDs represent a pixel so that a total image is represented from a large number of individual pixels. The lack of transparency of such displays suffers from the disadvantage that the use thereof is limited only to surfaces in which there is in any case no view through the display wall from the interior of the building or such view is lost. In addition such a display causes an enormous change in the appearance of a facade, due to its really great depth which can be in the region of 40 cm. The actual building shell can scarcely be seen even when the display is switched off. Further disadvantages are susceptibility in regard to fouling such as for example due to birds, insects or the like. Furthermore such large displays often involve no or only a slight degree of transparency. The incidence of light in areas behind the facade such as office rooms is thus blocked or at least severely restricted.

It is admittedly generally known for light emitting diodes also to be arranged in a transparent surface, but in that case the problem usually arises of still guaranteeing good transparency in spite of supply lines to the light emitting diodes. Accordingly, supply lines which are as thin as possible are used, but only a low level of power can be transmitted thereby. Accordingly only a few light emitting diodes can be actuated or only a few light emitting diodes in each case can be actuated. Accordingly only small surfaces or large surfaces with large spacings between the light emitting diodes can be supplied. In order to be able to transmit more power in spite of using electric supply lines of small cross-section, without increasing the electric current and thus the thermal loading on the lines, step-up transformation of the supply voltage has to be effected and in corresponding fashion basically at each light emitting diode step-down transformation again has to be effected, to the voltage suited to the light emitting diode. Such a procedure can be complicated and expensive and it involves a thermal loading when transforming or reducing the voltage.

Therefore the object of the invention is to propose an improvement or at least an alternative for at least one of the described disadvantages and in particular to provide an improved or alternative display option for facades or the like.

According to the invention there is proposed an insulating glass pane as set forth in claim 1. Thus the insulating glass pane according to the invention has two panes of glass which are arranged in plane-parallel and mutually spaced relationship by means of spacers and which form a gas-tightly sealed insulating space between them. Arranged in the insulating space are a plurality of mutually spaced light strips each having a plurality of mutually spaced light emitting elements. Each light strip includes a torsionally stiff carrier which passes through in the insulation in parallel relationship with the first and second panes. Accordingly therefore a firm stable carrier is arranged for each light strip extending transversely through the insulating space.

An insulating pane according to the invention can also have three or more panes arranged in mutually plane-parallel relationship so that two or more insulating spaces are arranged in mutually plane-parallel relationship. In that case light strips can be arranged in one or more of those insulating spaces.

More specifically the invention is based on the realisation that, even with stable and clearly visible light strips, high transparency for the insulating glass pane can overall still be achieved. In addition however further boundary conditions are also important for visibility of the light strips. In the case of a mirrored insulating glass pane, even when the light strip is switched off, the latter and its structure are at any event scarcely visible from the mirrored side. Added to that is the fact that such insulating glass panes are intended for the use of large facades and at any event an outside viewer usually sees the facade and thus the insulating glass panes from a great distance and then also scarcely or not at all perceives the light strips and the structure thereof. Each light strip may be visible from an inside view from a room in the building looking on to the insulating glass pane, but nonetheless a high transparency can be achieved in relation to spaced light strips and thus a markedly better view outwardly is always afforded than if an opaque display were suspended in front of the window, instead of the insulating glass pane according to the invention.

The insulating glass pane according to the invention thus provides a display which is integrated in the insulating glass and which uses the glazing forming part of a facade. There is in addition also the possibility, if facades have only a few or no glazed regions, to also use those surfaces as a large display, by means of a facade suspended in front thereof, in which case, depending on the respective panes used, the facade structure can still always be readily seen in the switched-off condition because basically a high level of transparency can be achieved with the insulating glass panes according to the invention.

In addition the light strips and thus the corresponding components such as light emitting elements and optionally an electronic control system or parts thereof are hermetically installed in the insulating glass. By virtue of drying agent generally contained in at least one spacer the electronic system is thus shielded in a space which contains scarcely any air moisture, at any event in relation to air moisture and fouling from the outside world. Fouling due to external influences such as birds and insects do not reach the elements in the insulating glass pane. Cleaning can be effected by a conventional facade cleaning procedure which is generally performed in any case. Basically a display composed of one or more insulating glass panes can shine again as on the first day.

It is desirable if the carrier is adapted to pass an electric supply current for supplying the light emitting elements with electrical energy. In that way a double function can be achieved with the carrier, which provides for mechanical stability and for carrying a supply current. In that connection the supply current preferably includes the current which transmits the required energy for lighting up all light emitting elements of the respective light strip.

Preferably the carrier includes electrically conducting elements, in particular metal elements such as metal bars or metal layers for carrying a or the supply current for the light emitting elements and for mechanically stabilising the carrier. Such metal elements like metal bars or metal layers have good electrical conductivity and in that respect are mechanically stable, at least in comparison with thin copper wires or the like. A double function can be achieved thereby because mechanically stable metal elements usually also enjoy electrical conductivity. Metal layers are preferably to be used as part of a circuit board, in particular a layer which is as thick as possible between two layer portions of a multi-layer circuit board.

Preferably the carrier includes a circuit board, or it is a circuit board, so that it substantially consists of a circuit board. In that case the circuit board not only involves the function of carrying conductor tracks and/or electrical components, but it also substantially contributes to mechanical stability of the carrier and thus of the light strip. In particular a multi-layer circuit board makes it possible to achieve a high level of mechanical stability. Preferably there is provided a metal layer for a positive electrical supply current and a metal layer for a negative supply current. Lines for data transmission and/or for actuation of the light emitting elements can be provided in a further plane.

The carrier preferably includes at least a first and a second metal bar which extend in mutually parallel relationship, which are mechanically fixedly connected together and which are electrically insulated relative to each other. The carrier and thus each light strip are thus of a mechanically stable nature and in that respect are basically clearly visible through a transparent pane, at any event in the switched-off condition of the light emitting elements.

The term metal bars is used to denote elongate elements of metal which can also carry a significant load in the transverse direction. They can be round or rectangular and in particular square in cross-section. For example a square cross-section with an edge length of 2 mm can be considered as an example. That however is only an example and other smaller but in particular also larger cross-sections can be considered, such as for example a cross-section measuring 3×3 or 4×4 mm or a rectangular cross-section of a similar or identical cross-sectional area.

The first and second metal bars are mechanically fixedly connected together. The two metal bars thus together substantially form a rigid unit. The connection is effected in principle along the entire length of the metal bars and the metal bars are preferably glued together. In particular an insulating glue is used for that purpose. In an embodiment the metal bars are each of a rectangular cross-section and thus each have four longitudinal sides. The metal bars are then glued in areal contact at a respective longitudinal side using the insulating adhesive to afford a rigid connection. Any other mechanical connecting processes however can also be considered such as screwing, clamping and laminating to name just a few examples.

Aluminium is preferably used as the material for the metal bars. Aluminium is quite light, it has high thermal conductivity and also quite good electrical conductivity. In principle it is also possible to use other metals or metal alloys such as copper or brass.

Preferably LEDs, in particular SMD-LEDs and/or multi-colour LEDs, in particular RGB-LEDs, are used as the light emitting elements. Light emitting diodes for which the abbreviation LED has become usual can also emit light with a relatively high level of brightness and in different colours, possibly in dependence on the LED used. Current consumption is low in comparison with conventional light means such as incandescent lamps. Preferably LEDs using the SMD technology (SMD: surface mounted device) are used to achieve a low installation depth for arrangement between the first and second panes of the insulating glass pane. Multi-coloured LEDs are also preferably used, with which the desired light colour can be achieved by suitable actuation. Preferably so-called RGB-LEDs are used, which can combine a red, a green and a blue component (abbreviated by RGB) substantially as desired in order thereby to visually produce substantially any colour point. In principle it would also be possible to actuate a group of LEDs of differing colour to achieve a similar effect, but that usually requires a larger amount of space.

In an embodiment it is proposed that at least one circuit board is fixed on each carrier. Each of those circuit boards has at least one of the light emitting elements and at least one end control unit for actuation of the light emitting elements. To produce a static or dynamic image, a light emitting element or a group of light emitting elements and a corresponding end control unit is associated for each pixel and thus for each position. The end control unit thus actuates that individual light emitting element or that group of light emitting elements.

The end control unit preferably actuates only one light emitting element when this involves a correspondingly complex element such as a multi-colour LED, in particular an RGB-LED. If a plurality of light emitting elements, in particular a plurality of LEDs, are associated with a pixel, those LEDs forming a group can be actuated by an end control unit.

The circuit board is preferably arranged in plane-parallel relationship with the first and second panes. That makes it possible to achieve a shallower structure than if the circuit board is arranged transversely. It was realised according to the invention that the fact that such a circuit board is possibly well visible through a glass pane causes few problems. In addition such a circuit board can preferably be limited to the width of the carrier. Preferably a circuit board also extends substantially over the overall length of the carrier, in which case that circuit board then correspondingly also carries a plurality of end control units and a plurality of light emitting elements or groups of light emitting elements, therefore for a plurality of pixels. Equally such an elongate circuit board can be mechanically interrupted and can be functionally connected to a respective adjacent circuit board by any electronic connecting lines.

Likewise the circuit board can be arranged for example transversely relative to the plane of the pane, to increase mechanical stability or for other reasons.

Preferably each circuit board is glued on to the carrier, in particular the two metal bars, by means of a partially conducting adhesive. That makes it possible to easily implement fixing and also electrical connection between the circuit board and the two metal bars. Such a partially conducting adhesive is basically electrically non-conducting so that no current can flow within an adhesive layer, that is to say parallel to its corresponding adhesive surface. However, with a suitably thin adhesive layer, the adhesive becomes conductive in the transverse direction—which can be explained by corresponding electrically conducting particles in the adhesive. Thus the circuit board can be easily glued on to both metal bars at the same time with an adhesive layer, wherein contacting with each of the metal bars is possible at the same time without electrically interconnecting the metal bars themselves.

Preferably the metal bars are used as electrical supply lines for supplying the light emitting elements with electrical energy. The metal bars which are of a large cross-sectional area to achieve mechanical stability, in particular torsional or twisting stiffness, can thus simultaneously carry a comparatively high electric current and can thus transmit a high electric supply power to the light emitting elements. That technology now makes it possible to supply even a relatively high number of light emitting elements on a light strip with supply energy. Thus, even with a small spacing between the light emitting elements, very long light strips can be produced and corresponding very large insulating glass panes can be equipped with light emitting elements at a small spacing.

Preferably light emitting strips of a length of at least 1 m, preferably at least 2 m and further preferably at least 2.5 m are proposed. The light emitting elements can be arranged for example at a spacing of 5 cm on a light strip so that 40 light emitting elements would have to be supplied with electric current on a light strip measuring 2 m.

Preferably the light strips additionally have data lines, in particular 3 or 4 data lines for supplying the end control units with data for respective actuation of the light emitting element or the group of light emitting elements. Those data lines can be arranged on the circuit board and, when using a plurality of circuit boards on a light strip, can be transmitted by corresponding electrical contact connections between two adjacent circuit boards. The supply lines are of a larger cross-section than the data lines.

Preferably the insulating glass pane is adapted to be supplied with an electrical voltage of about 5 V. In particular the end control units and/or the light emitting elements are matched to that voltage. Step-down transformation of a higher voltage is accordingly not required or is not required to any extent worth mentioning, on the light strips in relation to the end control units. The circuitry complication and expenditure can thus be kept within limits and using the metal bars as supply lines also makes it possible to supply a large number of light emitting elements on a light strip, when using a supply voltage of 5 V.

In an embodiment the light strips are arranged between and fixed to a first and a second spacer. The spacers which substantially form a boundary means of the insulating space thus serve at the same time as a fixing holder for the light strips. In particular, in relation to a prescribed arrangement of an insulating glass pane, the light strips are in principle fixed in mutually parallel relationship between an upper and a lower spacer, in particular being tensioned. For that purpose the light strips can be substantially non-elastically fixed to one of the two spacers with their one side and elastically fixed with a second end, in particular to the lower spacer. The light strips are thus basically perpendicularly tensioned between the two spacers and can compensate for any temperature-induced expansion phenomena by virtue of the provided elasticity.

Preferably the first metal bar is electrically conductingly connected to a first spacer and the second metal bar is electrically conductingly connected to the second spacer. The above-described mechanical fixing is thus at least partially non-conducting. In that way the first spacer for the first metal bar can provide a positive electrical supply current and the second spacer for the second metal bar can provide a negative electrical supply current, or vice-versa, in a simple fashion, when using a dc supply voltage. No additional supply line is required for that purpose along the spacers. Preferably the first and second spacers are in the form of solid metal bars or metal struts or solid metal profiles.

A configuration proposes that the light emitting elements respectively face with a lighting direction towards the first or second panes, in particular the lighting direction extends transversely relative to the first and second panes. Light emitting elements can usually emit light in a generally relatively large angular region and not just in one direction as would be the case with laser diodes with corresponding optical means. Nonetheless a lighting direction or at least a main lighting direction which is generally at the centre of the light emission region with respect to a light emission angle can be associated with most light emitting elements. In particular such a lighting direction also frequently faces away from a fixing side of the light emitting element. Preferably therefore the light emitting elements are adapted and arranged to provide that they light substantially transversely relative to the plane of the first and second panes and are arranged not just for lighting up the insulating space. In particular the light emitting elements emit light out of the insulating space through one of the two glass panes.

In addition it is proposed in accordance with an embodiment that some or all of the light strips are arranged parallel to each other at substantially equal spacings, in particular at a spacing of at least 5 mm, preferably at least 20 mm, and/or that the light emitting elements are distributed substantially uniformly over the insulating space and in particular in a plane in plane-parallel relationship with the first and second panes. Accordingly there is proposed distribution of the light emitting elements, that is uniform over the area of the insulating glass pane. The light action of the light emitting elements can thus act over an area, and in particular can provide an image or a portion of an image with a multiplicity of pixels. In particular the light strips are not to be provided only at the edge but are to be distributed substantially uniformly over the entire area. For optical reasons however it may be advantageous to provide a higher density of light emitting elements in portion-wise manner, such as for example in the edge region of the insulating glass pane. Corresponding edge effects due to non-illuminated facade elements can be taken into consideration in that respect.

It is also desirable if the light strips are of a constant width, in particular in the range of 2 to 7 mm, preferably 4 mm, and/or are of a maximum thickness of 2 to 7 mm, preferably about 3 mm. With a light strip width of 4 mm, even in the case of long light strips, it is still possible to achieve a stable carrier and at the same time the structure can be kept shallow, while good transparency can still be achieved at the same time. The preferred maximum thickness is in the range of 2 to 7 mm, preferably about 3 mm, for the light strips.

The preferred spacing of the first and second panes relative to each other is 12 to 20 mm, in particular about 16 mm. Preferably the insulating space is filled with an insulating gas such as for example argon. Thus such an insulating glass pane is of generally conventional dimensions and properties. Filling the insulating space with a noble gas relates to the free space remaining beside and between the introduced insulating strips, wherein the light strips and the individual elements thereof are at least partially in direct contact with the noble gas. An insulating glass pane according to the invention can thus be provided at usual locations like facades and the arrangement thereof in terms of structural engineering is not or is only slightly variable due to the provision of light strips according to the invention. Existing insulating glass panes can be replaced by those according to the invention or, in the event of a new build, insulating glass panes according to the invention can easily be used instead of known insulating glass panes. In particular the insulating glass panes according to the invention do not have to have any influence or may have scarcely any influence on any building structural engineering. The provision of additional holders for the insulating glass panes for representing static or moving images is also basically not necessary.

In particular insulating glass panes of basically any dimensions and in particular dimensions of any large size can also be provided with light strips such as for example also a pane size of 2.7×3.5 m or 3.5 m×2.7 m, to name just a further example. In a preferred embodiment the insulating glass pane is characterised in that there is provided at least one intermediate control unit for receiving an image data signal from a central control unit, for extracting end control data from the image data signal for individual light strips, for respectively actuating the light emitting elements of the respective light strip, and transmitting the end control data to the end control units of the respective light strips. Accordingly, provided for a plurality of end control units arranged on a respective light strip is an intermediate control unit which receives an overall image data signal and there receives and extracts data and distributes same to the end control units. In that respect such an image data signal basically includes all image data of an overall image which is to be represented by means of a plurality of light strips and in particular by means of a plurality of insulating glass panes. Each light emitting element or each group of light emitting elements of an end control unit is adapted to represent an image point, also referred to as a pixel. Each image point or each pixel is uniquely identified in particular by two-dimensional co-ordinates. The image data signal originating from the central control unit includes the items of information for the actuation of each pixel of the overall image or at least an image portion. The intermediate control unit receives that image data signal and—possibly by means of a further preliminary control unit—extracts the items of image information which are relevant to the light strips to which the respective intermediate control unit is connected by way of data lines. In an image by way of example having 26 pixel rows A-Z and 500 pixel columns 1-500 that gives a pixel field with the co-ordinates A1-Z500, from which for example an intermediate control unit extracts the items of information for the pixels A1-M250 and passes same to the 250 columns in question. The corresponding items of pixel information relevant for a light strip are transmitted by way of the data lines to the respective light strip and used by the respective end control units for actuation of each light emitting element or each group of light emitting elements of a pixel. In an embodiment the data lines include four individual lines, one each for a clock signal, a latch signal, a data signal and a minus line or ground line respectively.

Preferably there is provided an intermediate control unit for a respective pane and up to 175 light strips. An intermediate control unit is correspondingly connected to a plurality of light strips by way of data lines. Preferably the intermediate control unit—possibly with the aid of a preliminary control unit—is adapted to receive the image signal from the central control unit by wireless transmission, optical transmission or in wired fashion such as for example by way of a data bus. In particular the use of an optical transmission means that data can be transmitted quickly and thus for a large overall image having many pixels. The use of wireless transmission is particularly advantageous for saving on a large number of data lines. It is possible in that way for a large number of insulating glass panes to be easily assembled for example on a facade to provide an overall area, and actuated, without the facade or the associated building having to be prepared for correspondingly laying lines. Optionally, a plurality of amplifiers are to be provided in relation to large areas in order to increase the range of radio transmission from the central control unit and to reach all intermediate control units.

In addition there is provided an insulating glass pane arrangement comprising at least two insulating glass panes according to the invention, wherein the insulating glass pane arrangement in addition has a central control unit for providing an image data signal for controlling the representation of a static or dynamic overall image by the light emitting elements of the insulating glass panes in the totality thereof. Accordingly a plurality of insulating glass panes are combined and are jointly actuable by way of a central control unit. Accordingly a dynamic or static overall image can be represented by means of a plurality of assembled insulating glass panes. Besides a static image, that is to say a still image, dynamic images such as films or videos or the like and also dynamic and/or abstract sequences or effects as well as text including moving text can also be represented. Data can be successively transmitted from the central control unit for each moment in time to be represented, to represent a dynamic image, in particular a film.

There is also proposed a method as set forth in claim 14. In accordance therewith a plurality of insulating glass panes are used, for which there is a central control unit. The central control unit produces an image data signal which produces items of information for the actuation of all light emitting elements, used for the representation, of the insulating glass pane arrangement, in particular items of information for each pixel of an image and possibly for each moment in time to be represented. Such an image data signal is transmitted from the central control unit to the intermediate control units in wired fashion by means of a data bus, wirelessly and/or optically. The intermediate control units then extract end control data from the image data signal for the respective actuation of the light emitting elements of the respective light strip. The extracted end control data are transmitted from the intermediate control units to the end control units of the respective light strips. In that way the end control units receive the necessary items of information for actuation of the respective light emitting element associated with a pixel, or the respective group of light emitting elements of a pixel. On the basis of those data each end control unit then actuates the light emitting element associated therewith or the group of light emitting elements associated therewith to produce the respective pixel of the image at the respective moment in time as desired.

Preferably after transmission of the end control data from the intermediate control units to the end control units of the respective light strip an enable and/or start signal is only then sent to the end control units to start the actuation of individual light emitting elements by the respective end control units for representing a respective pixel of the image by at least one light emitting element, in particular to start same for all end control units at the same time. A latch signal can be used for that purpose. Accordingly firstly the data for all pixels can be transmitted to the individual end control units and the representation can then begin by a start signal for all pixels at the same time, that is to say synchronously. The control data transmitted in that case to the end control units can also involve items of information for a plurality of moments in time, in particular for a film sequence.

Preferably in particular the central control unit and/or the intermediate control units can have image data memories for storing image data of images or image sequences to be represented.

In addition, correction values can also be programmed in the end control units, stored therein, or optionally adaptively generated. Local particularities of each pixel can be taken into account by means of such correction values so that for example pixels at an edge of the insulating glass are switched to be somewhat brighter in order to compensate for an adjacent unlit edge region.

It can also be provided that the representation of the overall image or an image portion is measured and compensation is optionally provided, which for example provides for compensation for a particularly light and in particular white region. Such compensation can be implemented by way of the central control unit or locally by an intermediate control unit or an end control unit. It can be adaptively altered or can be fixedly predetermined. For that purpose preferably measurement values, in particular brightness measurement values in the region of the insulating glass pane arrangement or in a partial region thereof can be fed back to the central control and/or to intermediate controls and actuation of individual or all light emitting elements can be adapted in dependence thereon.

It is also advantageous for a building facade to be provided with an insulating glass pane arrangement having a plurality of insulating glass panes according to the invention. In that case insulating glass panes of differing sizes and shapes can also be combined. The choice of the respective insulating glass pane essentially depends on the facade to be equipped therewith. The central control unit and the intermediate control units can be adapted as desired to different insulating glass pane sizes and thus to different numbers of light strips in an insulating glass pane and to different number of light emitting elements on a light strip, that is to say in particular to different light strip lengths. In principle an intermediate control unit can also be connected to light strips involving different insulating glass panes.

Inclined arrangements of one or more insulating glass panes or even horizontal arrangements such as for example in an inclined or flat roof of a building can also be provided. The use of an insulating glass pane is also possible as a lighting means, for example by the light emitting elements facing from the insulating glass pane towards the interior of a building. That can be advantageous in particular in relation to insulating glass panes arranged in the roof region. For example an insulating glass pane can be fitted in such a way that during the day daylight shines therethrough into the building and when darkness falls the interior can then be lit by the switched-on insulating glass pane.

In other words therefore the invention concerns a display technology which is incorporated in insulating glass and which makes it possible to implement a display for the presentation of optical content, from one or more insulating glass panes. In that case the view therethrough from the building, even when the display is switched on, is afforded by a transparency of for example at least 80% with a pixel spacing of 2 cm. When such a display which could also be considered as a picture screen is switched off it is also possible to look through into the interior of the building. In that respect the display can comprise any amount of even different sizes of insulating glasses. That affords the possibility of also integrating the system in existing facades. According to the size and shapes of the unit and the desired pixel spacing any insulating glass pane of the display involves a given number of light strips which can also be referred to as circuit board columns or possibly circuit board rows, on which the light emitting elements, the electronic actuating system thereof, including actuation of the individual pixels and transmission of the control signals to the respective next pixel, and a line for the current supply, are disposed. The correspondingly adapted spacer frame of the insulating glass pane, which in the case of rectangular insulating glass panes basically has four spacers which are connected together, is used to receive the respective column and row ends respectively and at the same time serves as a conductor for the power supply to the columns. In particular two of the spacers serve as a line for the current supply. The so-called backplane is also disposed along one side of the spacer of the insulating glass. It receives the items of image information from the central control or the central control unit of the overall display and forwards same to the corresponding columns and rows respectively, preferably by means of intermediate control units.

According to the invention one or more insulating glass panes can also be considered as a transmedia facade which can be mounted as a facade, but also in free-standing or hanging relationship, in which case the light emitting elements, in particular together with the light strips, are so installed that there is to be transparency even from the immediate proximity, of preferably at least 80%. In this connection the expression immediate proximity is used to denote a viewer who is looking out of the window in which the above-mentioned transmedia facade is fitted. In the switched-off condition the installation components and in particular the light strips in the insulating glass are to be clearly perceived neither from the outside nor from the inside, when the viewer is at a correspondingly great distance.

Actuation of a display formed by an insulating glass pane or a plurality thereof is effected by a central control unit which sends the desired optical information of the first image to the first insulating glass pane in accordance with the resolution of the display in a so-called bit stream. There, the items of image information required for the unit are transmitted from controls integrated in the backplane, in particular intermediate control units, with a clock signal, to the corresponding columns, that is to say light strips, of the respective insulating glass pane. In the column in question of the light strip a control chip, in particular an end control unit of the first pixel, passes items of image information that are not required by way of a bus or data lines to the control chip or to the end control unit of the second pixel. Corresponding transmission optionally follows for a third and further pixels. With the items of information received for the pixel the chip actuates the associated LEDs, in particular RGB-LEDs. In addition items of image information are transmitted from a control of the backplane, which can also be an intermediate control unit, to the second insulating glass pane belonging to the display. That procedure is repeated very rapidly to the last insulating glass pane. Then the items of image information of the first image in respect of time are all at once actively switched to all pixels by way of the latch signal that is also supplied, and correspondingly represented.

The invention uses in particular the insulating glass panes present in a facade, in which respect a large number of insulating glass panes, even of different sizes and kinds, are used, such as for example conventional transparent insulating glasses but also non-transparent parapet insulating glasses in which a non-transparent pane is disposed in a plane 3 or 4. The maximum size of such a system is almost unlimited. If only relatively narrow opaque regions are disposed between the individual insulating glasses—as is usual in a post-and-horizontal bar structure—they can scarcely be perceived by the eye of the viewer due to the image of the facade swamping same. In the case of larger 'non-active' surfaces such as masonry between individual windows it is possible to blend in well with those surfaces by electronic brightness adaptation in the edge region. In that respect in an embodiment of the invention it is proposed that corresponding correction values can be programmed for each pixel in the end control units, in particular the pixel actuation chips.

What is crucial for the transparency of the display is the pixel spacing and dimensions of the circuit board used for the column. In an embodiment the width of the circuit board is about 4 mm. That gives a transparency of 80% with a pixel spacing of 20 mm in the case of viewing perpendicularly through the glazing. Systems in accordance with the state of the art in which light emitting elements are arranged outside the insulating glass achieve such a transparency at a pixel spacing of 40 mm and more. With a pixel spacing of 40 mm transparency of 90% can possibly be achieved, when viewing perpendicularly therethrough, with the present invention. The aforementioned systems outside the insulating glass therefore at best achieve a quarter of the resolution with the same surface area, with comparable transparency; that corresponds to double the pixel spacing.

An important underlying point of the present invention is that of minimising the waste heat of the system. For that reason it is proposed that the power supply of the individual insulating glass panes be placed near thereto, great distances result in voltage losses in the lines, which in turn would have the result that this would involve markedly higher voltages as the circuitry actually does not require being produced by the mains power supply unit. The excessively high voltage would have to be or would then be converted into heat again in the insulating glass.

Preferably an insulating glass pane is fitted in the facade of buildings or as a front-mounted or free-standing facade of insulating glass. In principle the technology according to the invention also makes it possible to implement applications without the use of insulating glass so that it is possible to mount the system and in particular the light strips for example between two plastic plates. With a standard size which is easy to transport of for example 1200 mm×800 mm it is possible to produce a transportable, quite rugged display system for large-scale functions. In that respect the weight advantage of plastic in relation to glass is considerable.

In general the combination of the various glasses and plastics permits a large number of outstanding points for the product. The following may be mentioned by way of example:

a) Outer pane sun protection glass—inner pane heat-insulating glass: due to the high degree of reflection of the outer pane from the exterior the installed components can no longer be seen at all from the exterior under daylight when the display or the light strips are switched off.

b) Outer pane normal glass—inner pane tinted glass: the contrast of the display is enhanced by the tinted background and the display has a brighter effect.

The invention affords still a further possible application: thus the system can also be used in relation to the room side and here also in the roof region. That permits the presentation of optical contents in the building but also the use of the system for effect lighting is a possibility.

The invention is described in greater detail hereinafter by means of some embodiments by way of example with reference to the accompanying Figures.

It is to be noted that identical references can denote similar but non-identical features or elements of the same or also different embodiments.

Figure 1:
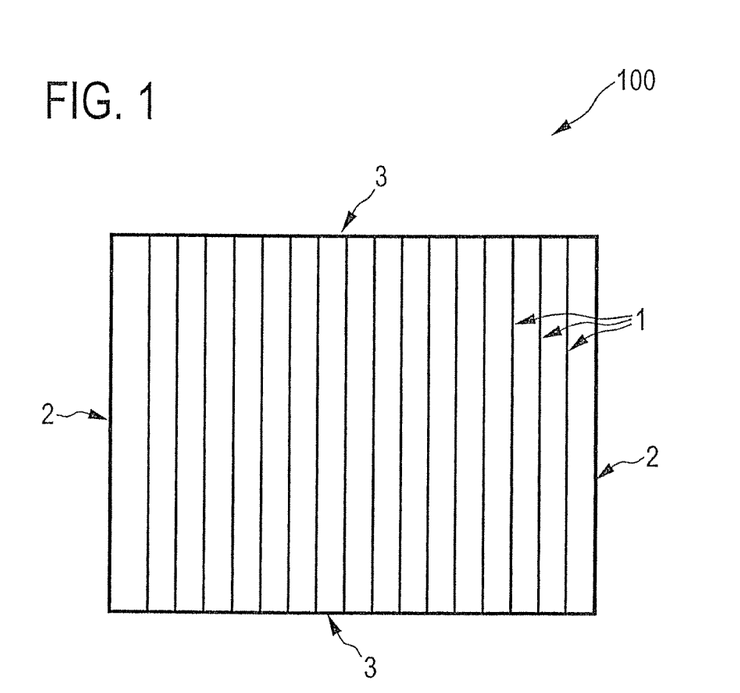
FIG. 1 shows a diagrammatic plan view of an insulating glass pane according to the invention.

FIG. 1 diagrammatically shows an insulating glass pane 100 having an upper and a lower spacer 3, between which a plurality of light strips 1 is fixed. The spacers 3 are preferably in the form of solid metal bars or profile members, for example of a T-shaped cross-section, to hold the light strips 1 and to serve as current feed means. The lateral spacers 2 are essentially required, together with the two spacers 3, to hold the first and second glass panes in mutually spaced relationship and to gas-tightly close off an insulating space therebetween. The lateral spacers 2 can be hollow and can be provided with a drying agent.

Figure 2:
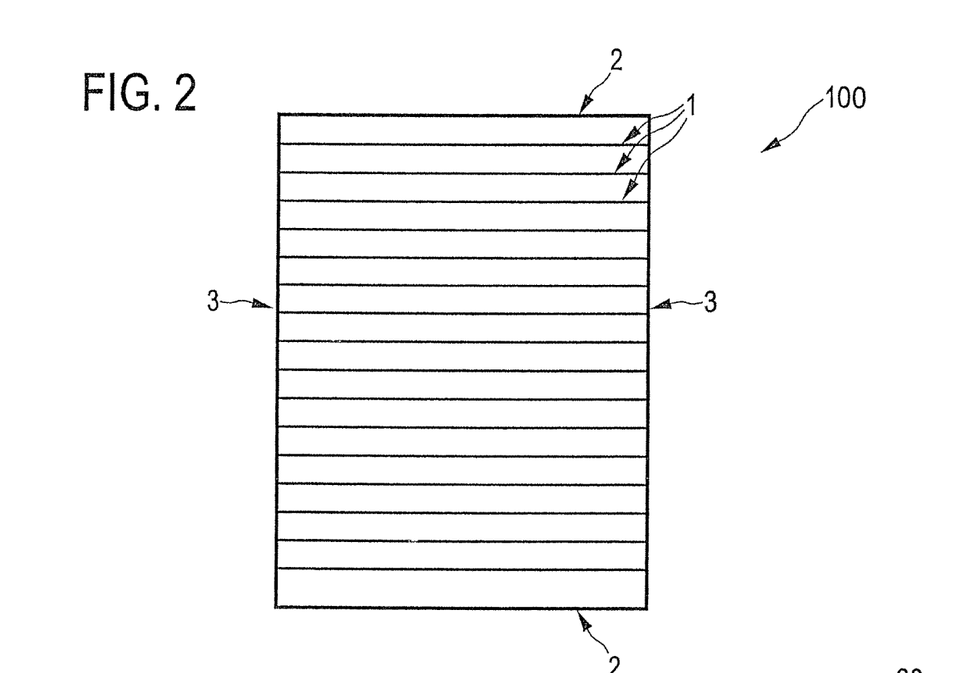
FIG. 2 shows a plan view on to an insulating glass pane as shown in FIG. 2 in a horizontal arrangement, FIG. 3 diagrammatically shows an insulating glass pane arrangement with six insulating glass panes and a central control unit.

FIG. 2 shows that a vertical installation of the insulating glass pane 100 of FIG. 1 is also possible. In this case the light strips 1 can be stretched horizontally between the spacers 3. The spacers 3 are arranged perpendicularly as shown in FIG. 2 but are in the form of solid metal bars in order also to be able to provide a supply current to the light strips 1.

Figure 3:
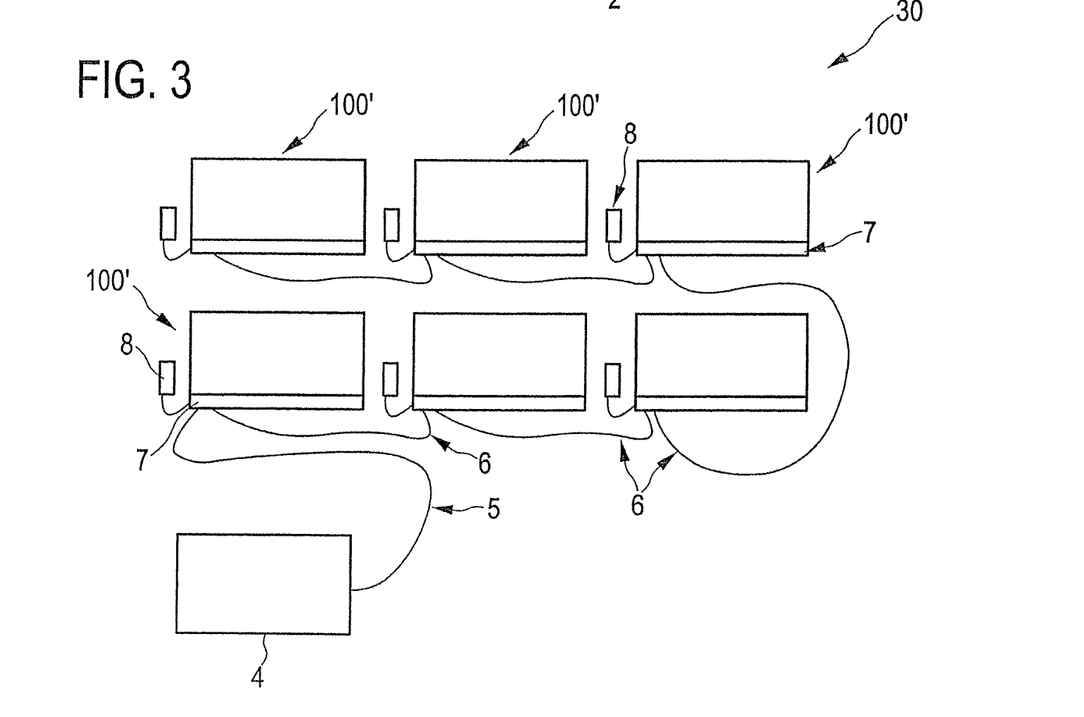

The insulating glass arrangement 30 in FIG. 3 includes six insulating glass panes 100'. Each insulating glass pane 100' is provided with a so-called backplane 7 for distributing items of actuation information for individual light strips and the light emitting elements arranged thereon. The backplane 7 may also respectively include one or more intermediate control units (not shown). There is also a current supply means 8 for each insulating glass pane.

A central control unit 4 produces image data for all insulating glass panes 100' forming the insulating glass pane arrangement 30. The image data are passed by way of the first main data line 5 from the central control unit 4 to a backplane 7 of a first insulating glass pane 100'. The backplane 7 extracts the items of information relevant to the insulating glass pane 100' thereof and passes the image data signal on the connecting data line 6 to the backplane 7 of the next insulating glass pane 100'. That procedure is performed for all insulating glass panes 100' and also the last insulating glass pane 100*. In a further embodiment, unlike the structure shown in FIG. 3, there can also be a return from the insulating glass pane to the central control unit 4. Measurement data or return message data of the individual insulating glass panes 100' and 100* or the corresponding backplane 7 can be passed back on such a return to the central control unit 4.

Figure 4:
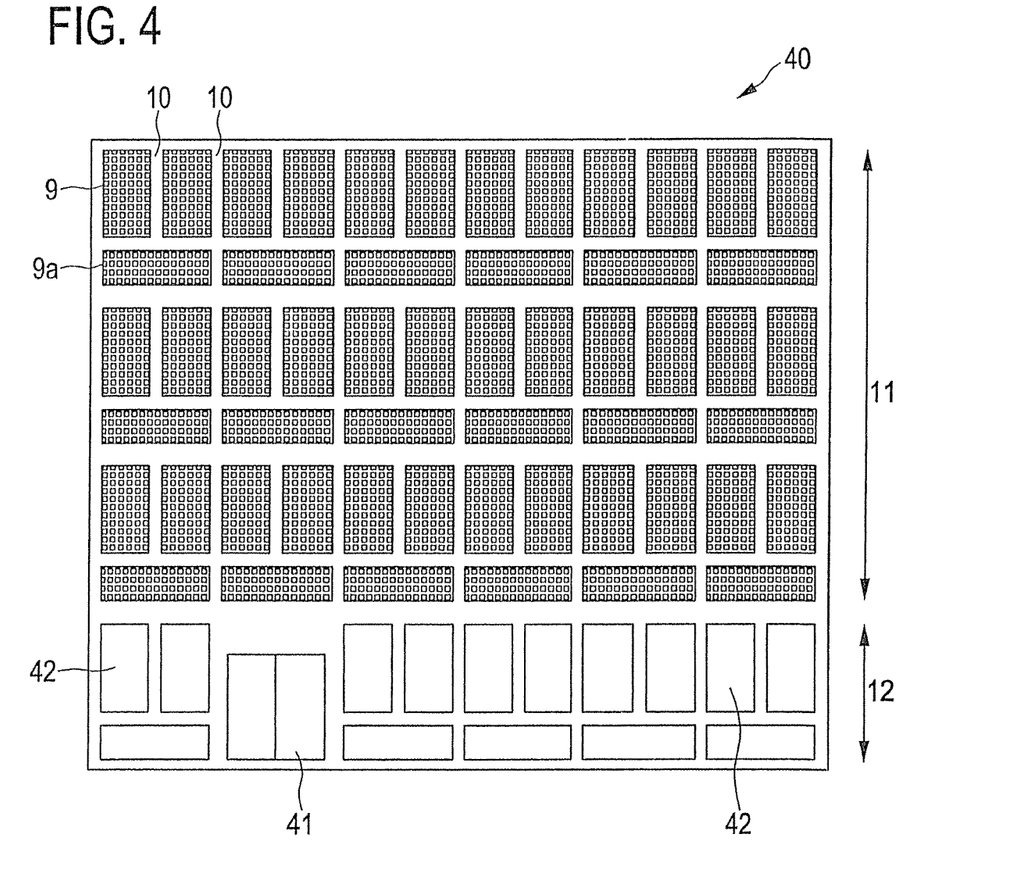
FIG. 4 shows a facade with insulating glass panes according to the invention.

FIG. 4 shows a facade 40 having a door 41 and various window panes 42 which are not according to the invention and which are basically arranged in the ground floor region 12. In addition the diagrammatic view in FIG. 4 shows the front for the first to third storeys in the region 11. Windows in the first to third storeys in accordance with region 11 are provided with vertically arranged insulating glass panes 9 and horizontally arranged insulating glass panes 9a in accordance with a configuration of the invention. Parts of the facade like facade carriers 10 are to be seen between the insulating glass panes 9 and 9a. The total of 56 insulating glass panes 9 and 9a thus form an overall display for the illustrated facade 40. In that respect the insulating glass panes 9 and 9a are arranged in the facade 40 as regular glazing, that is to say basically as windows. It is clear that the mere fact that the first insulating glass panes 9a begin above the ground floor as indicated by the region 12 already means that a viewer standing in front of the facade must be at a certain minimum distance even in relation to the lowermost insulating glass pane 9a and any light strips in the switched-off condition are scarcely visible.

The diagrammatically illustrated building facade in FIG. 4 can thus be used in the region 11 of the first to third storeys, as a large-scale display. The region in the ground floor at the region 12 is not affected. In that respect FIG. 4 is only shown by way of example and, particularly with even greater facades, more storeys can remain free in the lower region and a large-scale display can be arranged in a markedly higher region.

Figure 5:
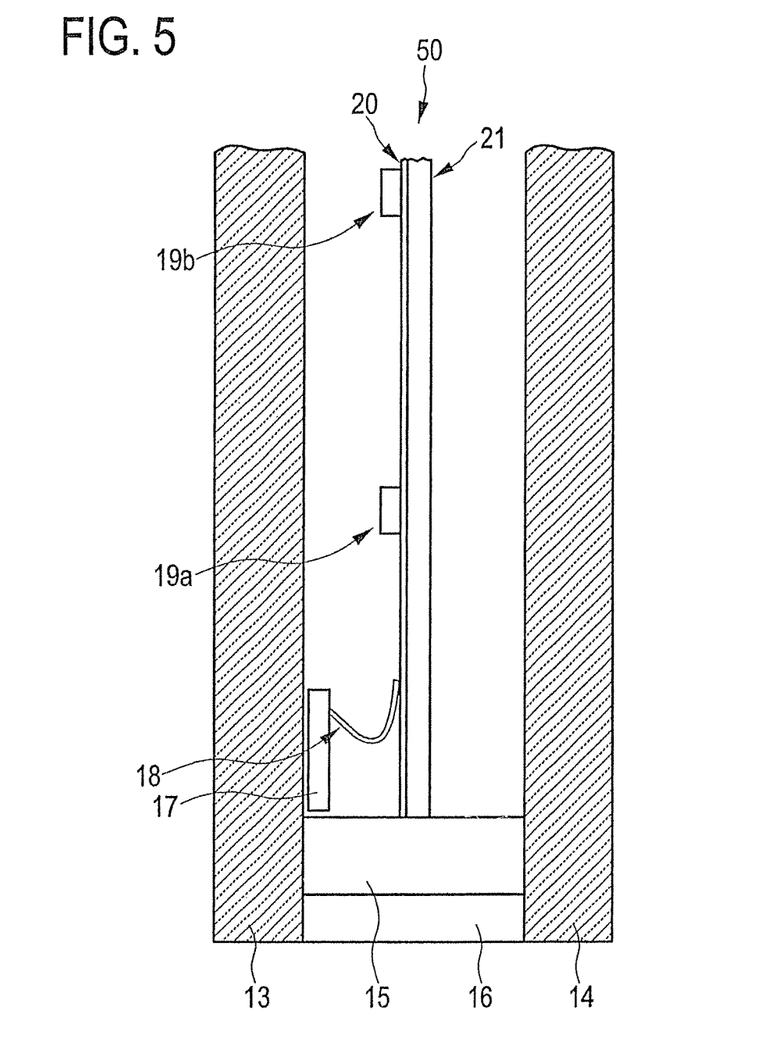
FIG. 5 shows a portion of a lateral sectional view of an insulating glass pane according to the invention.

The structure of an insulating glass pane will be apparent from FIG. 5, showing only a portion as a sectional view. A first and a second glass pane 13, 14 are arranged in mutually spaced parallel relationship by means of a plurality of spacers of which however only the spacer 15 is shown. In addition a sealing region 16 is provided for sealing purposes, in which region 16 a data line and in particular a data bus can also be passed.

A light strip 50 is fixed to the spacer 15. The spacer 15 thus also serves at the same time as a fixing means. The light strip 50 includes two metal bars of which the first metal bar 21 can be seen, which conceals a metal bar which is behind it in the direction of view on to FIG. 5. A circuit board 20 is fixed by means of a partially electrically conducting adhesive on the metal bar 21 and also the concealed metal bar which are fixedly glued together. The circuit board 20 is in the form of a continuous circuit board and includes first and second end control units 19A and 19B respectively. The end control units 19A and 19B are only diagrammatically shown and also each include a respective multi-coloured LED as the light emitting element.

The metal bar 21 is electrically connected to the spacer 15. The control data are transmitted from an intermediate control unit 17 by way of data lines 18 to the circuit board 20 and passed from there successively to the first end control unit 19A and further to the second end control unit 19B.

Figure 6:
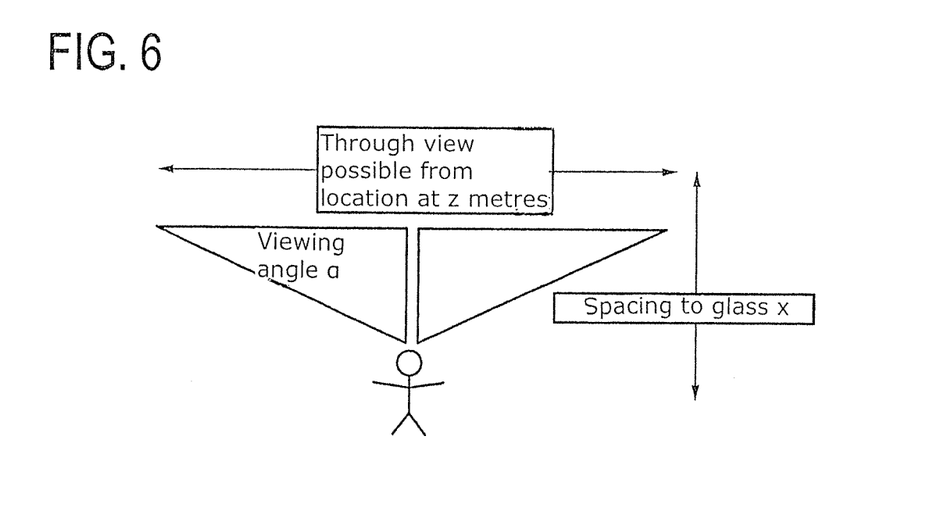
FIG. 6 shows the transparency and through-viewing capability through an insulating glass pane according to the invention.

FIG. 6 diagrammatically shows a person standing in front of an insulating glass pane according to the invention. The view through the insulating glass pane depends on the spacing between two adjacent light strips, with respect to two adjacent light emitting elements, which can also be referred to as the pixel spacing, the width and the depth of the light strip, when the basic starting point adopted for consideration in simplified terms is a light strip which is rectangular in cross-section, and the distance of the viewer from the insulating glass pane. A minimum viewing angle α is deduced from those values, above which minimum viewing angle it is possible to see through the insulating glass pane. In a corresponding fashion there is a free angle at which it is possible to see through the pane. Depending on the spacing of the viewer from the pane there is a pane width in which he can at least partially see through the pane and which is referred to hereinafter as the through-view width. The relationships are additionally illustrated in FIG. 7. In that respect it is assumed that the light strips are arranged perpendicularly.

Figure 7:
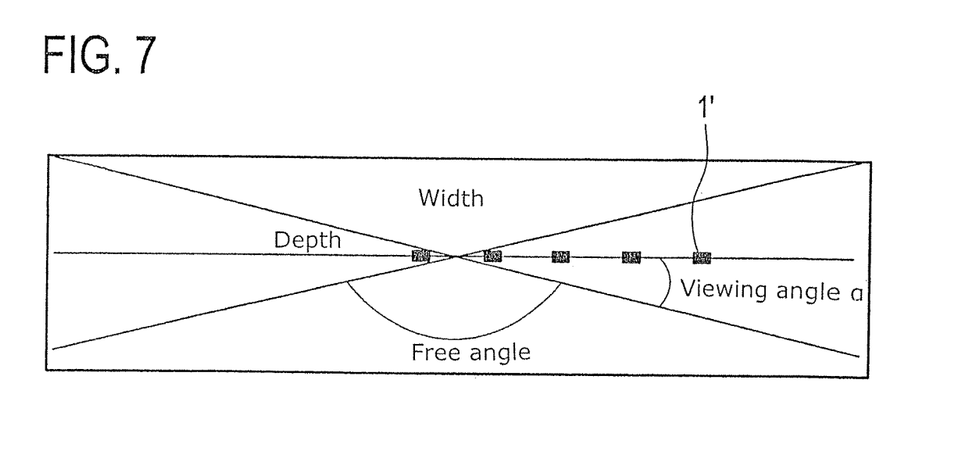
FIG. 7 shows the angle distributions of the possible view through an insulating glass pane according to the invention, FIG. 8 diagrammatically shows the fixing between a light strip and spacers, and FIG. 9 diagrammatically shows the connecting structure of a carrier of a light strip including a circuit board as a sectional view.

With a pixel spacing of 20 mm, a width of 4 mm and a depth of 3 mm, that gives a viewing angle α of 10.7° and a free angle of 158.5°. With a perpendicular view, a transparency of 80% can be specified. At a spacing of 1 m there is therefore a through-view width of 10.5 m and at a spacing of 5 m it is 52.7 m.

If the pixel spacing is increased to 40 mm the viewing angle α is 4.8° and the free angle is 170.5°. Transparency with a perpendicular view can be specified at 90%. At a spacing of 1 m there is therefore a through-view width of 23.9 m and at 5 m spacing it is 119.7 m.

Figure 8:
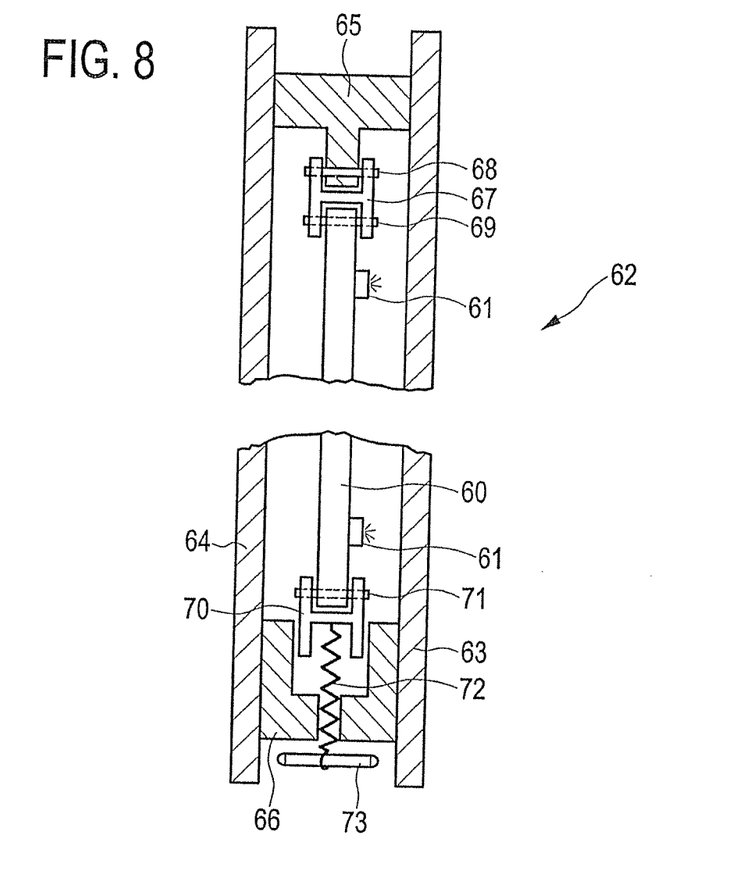

Referring to FIG. 8 a light strip 60 is arranged in the insulating glass pane 62 between first and second glass panes 63 and 64. Two end control units with LED 61 are symbolically illustrated. The glass panes 63, 64 are held at a spacing by means of the upper and lower spacers 65, 66. The upper spacer 65 is of a T-shaped cross-section and holds the light strip 60 by way of a first H-adaptor 67. A respective split pin 68, 69 is provided for fixing the H-adaptor 67 both to the upper spacer 65 and also to the light strip 60, it is also possible for example to use a screw.

The light strip is fixed to the lower spacer 66 by means of a second H-adaptor 70. In this case the fixing between the second H-adaptor 70 and the light strip 60 is effected by way of a split pin 71 whereas the second H-adaptor 70 is fixed by way of a spring 72 and a pin 73 elastically to the lower spacer. Any temperature-induced changes in length of the light strip 60 can thus be compensated by way of the spring 72 without the spring 72 having to bear the weight of the entire light strip 60.

Figure 9:
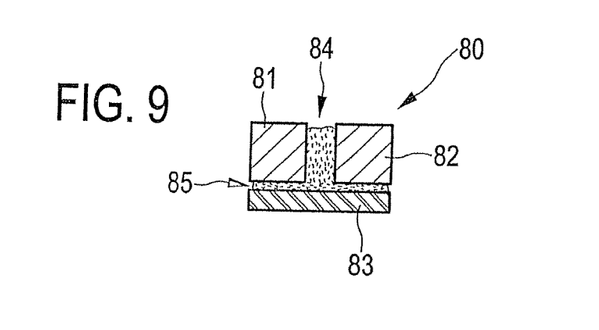

FIG. 9 shows a sectional view illustrating the structure of a carrier 80 with circuit board 83 fixed thereto. Any end control units or light emitting elements are not shown for the sake of enhanced clarity. The carrier 80 substantially comprises first and second metal bars 81, 82 which are glued together by means of an electrically insulating adhesive 84 and thereby form a fixed, in particular torsionally stiff construction. The circuit board 33 is fixedly connected to the first and second metal bars 81, 82 by means of a partially electrically conducting adhesive 85. The spacing from the circuit board 83 to the first and second metal bars 81 and 82 respectively is so small that there is in each case an electrically conductive connection. An electrically conducting connection however does not occur in the adhesive 85 along the circuit board 83 and thus also not between the first and second metal bars 81, 82. The metal bars 81, 82 can therefore be used as single, galvanically separated supply lines.

The invention claimed is:

1. An insulating glass pane comprising a first and a second pane of glass, the first and second panes are arranged in mutually plane-parallel spaced relationship by means of spacers, an insulating space is formed between the first and second panes and gas-tightly sealed off, a plurality of mutually spaced light strips each having a plurality of mutually spaced light emitting elements are arranged in the insulating space and each of the light strips includes a torsionally stiff carrier passing through the insulating space parallel to the first and second panes, characterised in that at least one circuit board is fixed on each carrier and/or the carrier includes or is a circuit board, and further characterised in that the circuit board is of a multi-layer and mechanically stable, in particular torsionally stiff nature and is adapted to carry an electric supply current for supplying the light emitting elements with electrical energy and/or each of the circuit boards has at least one of the light emitting elements and at least one end control unit for actuation of the light emitting elements, in particular that the circuit boards are arranged in plane-parallel relationship with the first and second panes and/or the circuit board is glued by means of a partially conducting adhesive on the carrier or a part thereof, in particular on metal bars of the carrier.

2. The insulating pane according to claim 1 characterised in that the carrier is adapted to carry an electric supply current for supplying the light emitting elements with electrical energy.

3. The insulating glass pane according to claim 1 characterised in that the carrier includes electrically conducting elements, in particular metal elements like metal bars or metal layers, for carrying a supply current for the light emitting elements and for mechanically stabilising the carrier.

4. The insulating glass pane according to claim 1 characterised in that each of the carriers includes a first and a second metal bar which extend parallel to each other, which are mechanically fixedly connected to each other and which are electrically insulated relative to each other.

5. The insulating glass pane according to claim 4 characterised in that the metal bars are glued together and/or made from aluminum.

6. The insulating glass pane according to claim 1 characterised in that LEDs, in particular SMD-LEDs and/or multi-colour LEDs, in particular RGB-LEDs, are used as the light emitting elements.

7. The insulating glass pane according to claim 1 characterised in that the light strips are of a length of at least 1 m, preferably at least 2 m and further preferably at least 2.5 m.

8. The insulating glass pane according to claim 1 characterised in that the light emitting elements respectively face with a lighting direction towards the first or second pane, and in particular the lighting direction extends transversely relative to the first and second panes.

9. The insulating glass pane according to claim 1 characterised in that some or all of the light strips are arranged parallel to each other at the same spacing, in particular at a spacing of at least 5 mm, preferably at least 20 mm, and/or the light emitting elements are distributed substantially uniformly over the insulating space, in particular in a plane in plane-parallel relationship with the first and second panes.

10. The insulating glass pane according to claim 1 characterised in that the light strips (are of a constant width, in particular the region of 2-7 mm, preferably about 4 mm, and/or are of a maximum thickness of 2-7 mm, preferably about 3 mm.

11. The insulating glass pane according to claim 1 characterised in that the first and second panes are at a spacing of 12-20 mm, in particular about 16 mm, and/or the insulating space is filled with a noble gas.

12. The insulating glass pane arrangement comprising at least two insulating glass panes according to claim 1, further including a central control unit for providing an image data signal for controlling the representation of a static or dynamic overall image by the light emitting elements of the insulating glass pane.

13. A method of representing a static or dynamic image by means of an insulating glass pane arrangement according to claim 12, including the steps:
producing an image data signal in the central control unit including items of information for the actuation of all light emitting elements of the insulating glass pane arrangement, that are used for the representation,
transmitting the image data signal from the central control unit to intermediate control units in wired, wireless or optical form,
extracting end control data by the respective intermediate control unit from the image data signal for individual light strips for the respective actuation of the light emitting elements of the respective light strip,
transmitting the end control data from the intermediate control units to end control units of the respective light strips, and
actuating individual light emitting elements by the respective end control units for representing a respective pixel of the image by at least one light emitting element.

14. The method according to claim 13 characterised in that after transmission of the end control data from the intermediate control units to end control of the respective light strips an enable and/or start signal is only then sent to the end control units to start the actuation of individual light emitting elements by the respective end control units for representing a respective pixel of the image by at least one light emitting element, and in particular to start same at the same time for all end control units.

15. The method according to claim 13 characterized in that measurement values, in particular brightness measurement values, of the or in the region of the insulating glass pane arrangement or in a partial region thereof are passed back to the central control unit (4) and/or to intermediate control units and the actuation of individual ones of or all light emitting elements is adapted in dependence thereon.

16. A building facade having an insulating glass pane arrangement according to claim 12.

17. An insulating glass pane comprising a first and a second pane of glass, the first and second panes are arranged in mutually plane-parallel spaced relationship by means of spacers, an insulating space is formed between the first and second panes and gas-tightly sealed off, a plurality of mutually spaced light strips each having a plurality of mutually spaced light emitting elements are arranged in the insulating space and each of the light strips includes a torsionally stiff carrier passing through the insulating space parallel to the first and second panes, characterised in that the metal bars are used as electric supply lines for supplying the light emitting elements with electrical energy and the light strips additionally have a data line for supplying end control units or the end control units with data, wherein the supply lines are of a larger cross-section than the data lines, or the insulating glass pane is adapted to be supplied with an electrical voltage of about 5 V.

18. An insulating glass pane comprising a first and a second pane of glass, the first and second panes are arranged in mutually plane-parallel spaced relationship by means of spacers, an insulating space is formed between the first and second panes and gas-tightly sealed off, a plurality of mutually spaced light strips each having a plurality of mutually spaced light emitting elements are arranged in the insulating space and each of the light strips includes a torsionally stiff carrier passing through the insulating space parallel to the first and second panes, characterised in that the light strips are arranged between a first and a second spacer and are fixed thereto, in particular elastically, wherein the first metal bar is electrically conductingly connected to the first spacer and the second metal bar is electrically conductingly connected to the second pacer to be supplied with electrical energy by way of the first and second spacers.

19. An insulating glass pane comprising a first and a second pane of glass, the first and second panes are arranged in mutually plane-parallel spaced relationship by means of spacers, an insulating space is formed between the first and second panes and gas-tightly sealed off, a plurality of mutually spaced light strips each having a plurality of mutually spaced light emitting elements are arranged in the insulating space and each of the light strips includes a torsionally stiff carrier passing through the insulating space parallel to the first and second panes, characterised in that there is provided at least one intermediate control unit for receiving an image data signal from a central control unit for extracting end control data from the image data signal for individual light strips for respective actuation of the light emitting elements of the respective light strip and for transmission of the end control data to the end control units of the respective light strip.

20. The insulating glass pane according to claim 19, characterised in that there is provided an intermediate control unit for a plurality of light strips and/or the intermediate control unit is adapted to receive the image data signal by wireless or optical transmission from the central control unit.

\* \* \* \* \*